US009864929B2

(12) United States Patent
Gu et al.

(10) Patent No.: US 9,864,929 B2
(45) Date of Patent: Jan. 9, 2018

(54) IMAGE CLUSTERING FOR ESTIMATION OF ILLUMINATION SPECTRA

(71) Applicant: NATIONAL ICT AUSTRALIA LIMITED, Eveleigh (AU)

(72) Inventors: Lin Gu, Eveleigh (AU); Cong Phuoc Huynh, Eveleigh (AU); Antonio Robles-Kelly, Eveleigh (AU)

(73) Assignee: NATIONAL ICT AUSTRALIA LIMITED, Eveleigh, New South Wales (AU)

( * ) Notice: Subject to any disclaimer, the term of this patent is extended or adjusted under 35 U.S.C. 154(b) by 103 days.

(21) Appl. No.: 14/888,355

(22) PCT Filed: May 2, 2014

(86) PCT No.: PCT/AU2014/000491
§ 371 (c)(1),
(2) Date: Oct. 30, 2015

(87) PCT Pub. No.: WO2014/176641
PCT Pub. Date: Nov. 6, 2014

(65) Prior Publication Data
US 2016/0078317 A1 Mar. 17, 2016

(30) Foreign Application Priority Data
May 3, 2013 (AU) ................................ 2013901564

(51) Int. Cl.
*G06K 9/62* (2006.01)
*G06K 9/52* (2006.01)
(Continued)

(52) U.S. Cl.
CPC ......... *G06K 9/6218* (2013.01); *G06K 9/0063* (2013.01); *G06K 9/4661* (2013.01); *G06K 9/52* (2013.01)

(58) Field of Classification Search
CPC ...... G06K 9/0063; G06K 9/4661; G06K 9/52; G06K 9/6218
See application file for complete search history.

(56) References Cited

U.S. PATENT DOCUMENTS

2008/0046217 A1* 2/2008 Polonskiy ................. G01J 3/28
702/179
2010/0303371 A1* 12/2010 Robinson ............. G06K 9/6232
382/254

(Continued)

OTHER PUBLICATIONS

PCT International Search Report and the Written Opinion of the International Searching Authority, Australian Patent Office, PCT/AU2014/000491, 9 pages, dated Jun. 4, 2014.

(Continued)

*Primary Examiner* — Sean Conner
*Assistant Examiner* — Pinalben Patel

(57) ABSTRACT

This disclosure concerns processing of electronic images, such as hyperspectral or multispectral images. A processor performs a method for estimating an illumination spectrum of an image which defines an input spectrum for each point of the image. The processor determines for each point of a first set of points a measure of variation in relation to the input spectrum of that point. The processor then selects one point from the first set based on the measure of variation. The processor determines a cluster of points based on the input spectrum of the selected point and determines an estimate for the illumination spectrum based on the input spectra of points in the cluster. Since the processor selects a point based on the measure of variation and then determines a cluster based on that point, it performs better than using other methods where the cluster is determined based on a random starting point, for example.

16 Claims, 12 Drawing Sheets

(51) Int. Cl.
    *G06K 9/46*         (2006.01)
    *G06K 9/00*         (2006.01)

(56) References Cited

U.S. PATENT DOCUMENTS

| | | | | |
|---|---|---|---|---|
| 2011/0057946 | A1* | 3/2011 | Yamamoto | G06K 9/00134<br>345/589 |
| 2012/0141044 | A1* | 6/2012 | Kwatra | G06T 5/008<br>382/274 |
| 2013/0114911 | A1* | 5/2013 | Smith | G06K 9/4661<br>382/260 |
| 2013/0336586 | A1* | 12/2013 | Moriuchi | G06K 9/4661<br>382/170 |

OTHER PUBLICATIONS

Belhumeur et al., "What is the Set of Images of an Object under all Possible Illumination Conditions?", International Journal of Computer Vision, vol. 28, Issue 3, pp. 245-260, 1998.

Gijsenij et al., "Color Constancy for Multiple Light Sources", IEEE Transactions on Image Processing, vol. 21, No. 2, Feb. 2012, pp. 698-707.

Riess et al., "Illuminant Color Estimation for Real-World Mixed-Illuminant Scenes", 2011 IEEE International Conference on Computer Vision Workshops, pp. 782-789.

* cited by examiner

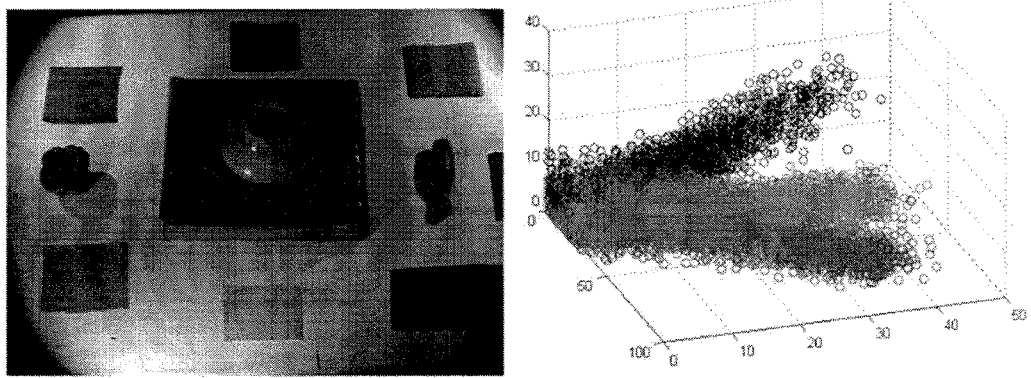

Algorithm 1 Recover the coefficients $\alpha$, the pixel subsets $\Omega_m$ and the posterior probability $p(L_m|u)$.

---

Require: $\mathbf{I}(u)$: the radiance spectra at each image pixel $u$.
1: Set the number of mixture components $M$.
2: Initialise $\alpha_m^{(0)}, \Omega_m^{(0)}, m = 1, \ldots, M$ as in Algorithm 2.
3: Compute the mixture coefficient $\alpha$, recover the posterior probability $p(L_m|u)$ and the pixel subset $\Omega_m$ using Algorithm 3.
4: return $\alpha_m^{(t)}, \Omega_m^{(t)}, p^{(t)}(L_m|u), \forall m = 1, \ldots, M$.

Algorithm 2 Initialise the pixel clusters $\Omega_1, \Omega_2, \ldots, \Omega_M$.

Require: $\mathbf{I}(u)$: the radiance spectra at each image pixel $u$.
$M$: The number of mixture components.
1: {Initialise the current set of pixels} $\mathcal{J}_1 \leftarrow \mathcal{I}$
2: for $m = 1, \ldots, M$ do
3:     Randomly select $\mathcal{K}_m \subset \mathcal{J}_m$.
4:     $W_m \leftarrow span(\{\mathbf{I}(u)|u \in \mathcal{K}_m\})$.
5:     $\forall u \in \mathcal{J}_m \setminus \mathcal{K}_m$, let $\mathbf{Q}(u) \leftarrow \Pi_{W_m}(\mathbf{I}(u))$.
6:     for $u \in \mathcal{J}_m \setminus \mathcal{K}_m$ do
7:         Define $\mathcal{T}(u) \leftarrow \{v|\|\mathbf{Q}(u) - \mathbf{Q}(v)\| \leq \epsilon_1\}$ {$\mathcal{T}(u)$ is the neighbourhood of $u$ when projected onto $W_m$.}
8:         $\bar{\mathbf{P}} \leftarrow \frac{1}{|\mathcal{T}(u)|} \sum_{v \in \mathcal{T}(u)} \mathbf{Q}(v)$.
9:         $\mathbf{A} \leftarrow [\mathbf{Q}(v_1) - \bar{\mathbf{P}}, \ldots, \mathbf{Q}(v_{|\mathcal{T}(u)|}) - \bar{\mathbf{P}}]$ where $v_i \in \mathcal{T}(u)$.
10:       $\sigma(u) \leftarrow$ the largest singular value of $\mathbf{A}$.
11:     end for
12:     Find $u_0 \in \mathcal{J}_m \setminus \mathcal{K}_m$ such that $\sigma(u_0)$ is maximal.
13:     Find a direction $V_m \subset W_m$ which maximises $Var(\Pi_{V_m}(\{\mathbf{Q}(u)|u \in \mathcal{K}_m\}))$.
14:     Let $U_m$ be the subspace of $W_m$ orthogonal to $V_m$.
15:     Find the maximal pixel subset $\Omega_m^{(0)} \subset \mathcal{J}_m \setminus \mathcal{K}_m$ such that $\|\mathbf{I}(u) - \mathbf{I}(u_0)\| \leq \epsilon_2$ and $\|\Pi_{U_m}(\bar{\mathbf{I}}(u)) - \Pi_{U_m}(\mathbf{I}(u_0))\| \leq \epsilon_3 \ \forall u \in \Omega_m^{(0)}$, where $\bar{\mathbf{I}}(u) = \frac{\sum_{u \in \Omega_m} \mathbf{I}(u)}{|\Omega_m|}$.
16:     $n_m^{(0)} \leftarrow |\Omega_m^{(0)}|$.
17:     $\alpha_m^{(0)} \leftarrow \frac{n_m^{(0)}}{\sum_{m=1}^M n_m^{(0)}}$.
18:     Update the remaining set of pixels $\mathcal{J}_{m+1} \leftarrow \mathcal{J}_m \setminus \Omega_m^{(0)}$.

19: end for
20: return $\Omega_m^{(0)}, \forall m = 1, \ldots, M$.

Fig. 13

Algorithm 3 Compute the mixture coefficient $\alpha$, the posterior probability $p(L_m|u)$ and the pixel subset $\Omega_m$.

Require: $I(u)$: the radiance spectra at each image pixel $u$.
   $M$: The number of mixture components.
1: Nil
2: repeat
3:   Update $p^{(t+1)}(L_m|u)$ by solving Equation 16.
4:   $\alpha_m^{(t+1)} = \frac{\sum_{u \in \mathcal{I}} p^{(t+1)}(L_m|u)}{|\mathcal{I}|}$ (Equation 18).
5:   $\forall u \in \mathcal{I}$, define $l(u) = \text{argmax}_{1 \leq m \leq M} p^{(t+1)}(L_m|u)$.
6:   for $m = 1, \ldots, M$ do
7:     Define $\Upsilon_m = \{u \in \mathcal{I} | l(u) = m \text{ and } p^{(t+1)}(L_m|u) > t_l\}$.
8:     $\forall u \in \Upsilon_m$, let $\mathcal{S}^r(u)$ be the set of $r$ pixels with their radiance spectra nearest to $I(u)$.
9:     $\Omega_m^{(t+1)} \leftarrow \Omega_m^{(t)} \cup (\cup_{u \in \Upsilon_m} \mathcal{S}^r(u))$.
10:  end for
11:  $t \leftarrow t + 1$.
12: until $\alpha_m^{(t)}, \Omega_m^{(t)}, p^{(t)}(L_m|u)$ are close to $\alpha_m^{(t-1)}, \Omega_m^{(t-1)}, p^{(t-1)}(L_m|u)$ within a tolerance.
13: return $\alpha_m^{(t)}, \Omega_m^{(t)}, p^{(t)}(L_m|u), \forall m = 1, \ldots, M$.

Fig. 14

IMAGE CLUSTERING FOR ESTIMATION OF ILLUMINATION SPECTRA

CROSS-REFERENCE TO RELATED APPLICATIONS

The present application claims priority from Australian Provisional Patent Application No 2013901564 filed on 3 May 2013, the content of which is incorporated herein by reference.

TECHNICAL FIELD

This disclosure concerns processing of electronic images, such as hyperspectral or multispectral images. In particular the invention concerns, but is not limited to, methods, software and computer systems for estimating an illumination spectrum of an image.

BACKGROUND ART

Detecting and estimating illuminant colours are important tasks with applications in recognition and classification based on photometric invariants [46], white balancing [23], colour correction, digital media production and graphics [30]. Despite its importance, the recovery and identification of illuminant colours in a scene has proven to be difficult task in uncontrolled real world scenes. This is mainly due to the fact that the recovery of region-wise illumination from a single image is an under-constrained problem [3]. As a result, existing methods often assume a uniform illumination power spectrum throughout the scene [24, 28].

FIG. 1 illustrates an example scene 100 comprising a mountain 102 illuminated by the sun 104 and by light scattered from the atmosphere 106. A first part 110 of mountain 102 is illuminated only by the sun 104, while a second part 112 of the mountain 102 is illuminated only by the atmosphere 106. Each of the two light sources sun 104 and atmosphere 106 has a different illumination spectrum.

When capturing scene 100, conventional cameras assume that there is only a single illumination source, such as the sun 104, for example. As a result, the image appears natural for the first part 110 of mountain 102 but unnatural for second part 112 due to an incorrect white balance, for example.

FIG. 2 illustrates the example scene 100 in more detail. Each of the illuminants sun 104 and atmosphere 106 has a respective illuminant spectrum 204 and 206. The mountain 102 has a reflectance spectrum 210. For simplicity only one reflectance spectrum is shown but of course, many different reflectance spectra of many different materials may be present.

When the light from the illuminants 104 and 106 hits the mountain 102, the illuminant spectra 204 and 206 are multiplied by the reflectance spectrum 210. The resulting spectra are superimposed and reach a sensor 212 as a radiance spectrum 214. The sensor 212 has a number of pixels, such as one million, and captures for each pixel location a separate sampled version of the radiance spectrum.

FIG. 3 illustrates a transformation 300 of first and second pixel radiance spectra 310 and 320 respectively, into a spectral space 330. The first pixel radiance spectrum 310 is sampled at two wavelengths $\lambda_1$ and $\lambda_2$. This results in radiance values 311 and 312. The radiance values 311 and 312 of the first pixel are represented by a first sample 331 in the two-dimensional spectral space 330.

Similarly, the second pixel radiance spectrum 320 is sampled at the same two wavelengths $\lambda_1$ and $\lambda_2$ resulting in radiance values 321 and 322, which are represented by a second sample 332 in the spectral space 330. In this way, the radiance spectra of many pixels can be represented in the same spectral space 330.

It is noted that in most applications the radiance spectra are sampled at far more points, such as one hundred. In fact, the sample wavelengths may be the same as the wavelengths of the hyperspectral image data. As a result, the sample space 330 is high-dimensional—one dimension for each wavelength.

Any discussion of documents, acts, materials, devices, articles or the like which has been included in the present specification is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

DISCLOSURE OF INVENTION

There is provided a computer implemented method for estimating an illumination spectrum of an image. The image is comprised of points of wavelength indexed spectral data and the wavelength indexed spectral data defines an input spectrum for each point of the image. The method comprises:

determining for each point of a first set of points of the image a measure of variation in relation to the input spectrum of that point;

selecting one point from the first set based on the measure of variation for each point of the first set such that the variation in relation to the input spectrum of the selected one point of the first set is greater than the variation in relation to the input spectra of other points of the first set;

determining a cluster of points of the image based on the input spectrum of the selected one point of the first set; and determining an estimate for the illumination spectrum based on the input spectra of points of the image in the cluster.

The result of cluster growing algorithms strongly depends on the initialisation of the algorithm. Since the method selects one point based on a measure of variation and then determines a cluster based on that point, the method performs better than other methods where the cluster is determined based on a random starting point, for example. The measure of variation is a direct indication of whether the input spectrum of the point of the image is close to an individual component spectrum of a mixture and therefore, determining the cluster based on that point allows the clustering to start from a point that is already close to the component spectrum that is to be determined by the clustering. As a result, the clustering converges more reliably and faster than other methods.

The method may further comprise repeating the method to determine multiple clusters of points of the image and to determine an estimate for the illumination spectrum for each of the multiple clusters.

Since the method determines multiple clusters and multiple illuminant spectra the method can be applied to images of scenes which are illuminated by multiple illuminants. This is a clear advantage over other methods that fail in cases of multiple illuminants.

The method may further comprise determining the first set of points of the image by excluding from the points of the image the cluster of points from a previous iteration.

Determining the measure of variation may comprise determining the measure of variation based on a second set of points of the image, the second set and the first set being disjoint.

The method may further comprise randomly selecting the points of the second set from the points of the image.

Determining the measure of variation may comprise determining a projection of the input spectrum of each point of the first set onto a subspace spanned by the input spectra of the points of the second set.

The method may further comprise determining a third set of points of the image for each point of the first set based on the projection, wherein determining the measure of variation may comprise determining the measure of variation based on the input spectra of the points of the third set.

Determining the measure of variation may comprise determining the measure of variation of the projection of the input spectra of the points of the third set onto the subspace spanned by the input spectra of the points of the second set.

The method may further comprise:
determining a first direction by maximising a variance of projections of the input spectra of the points of the second set onto the first direction; and
determining an orthogonal subspace that is orthogonal to the first direction, wherein determining the cluster of points of the image may comprise determining the cluster of points of the image based on a first difference to the input spectrum of the selected one of the first set and the first difference may be based on a projection of the input spectrum onto the orthogonal subspace.

Determining the cluster of points of the image may comprise determining the cluster of points of the image based on a second difference to the input spectrum of the selected one point from the first set.

The method may further comprise:
repeating the method to determine multiple clusters of points of the image; and
growing the multiple clusters of points of the image by associating a fourth point of the image which is not associated with any of the multiple clusters with one of the multiple clusters.

Growing the multiple clusters of points of the image may comprise:
determining a similarity measure between the fourth point of the image and each of the multiple clusters;
selecting one of the multiple clusters based on the similarity measure for each of the multiple clusters; and
associating the fourth point of the image with the selected one of the multiple clusters.

Growing the multiple clusters may be based on a smoothness constraint.

The similarity measure may be based on a difference between the input spectrum of the fourth point of the image and the input spectra of points of the image in each of the multiple clusters.

The difference may be based on a kernel function.

The similarity measure may be based on a probability density function.

The image may be a hyperspectral or multispectral image.

The method may further comprise storing the estimate for the illumination spectrum on a datastore.

The method may further comprise:
processing the image based on the illumination spectrum to obtain a processed image; and
storing the processed image on a datastore.

Software, when installed on a computer, causes the computer to perform the above method.

There is provided a computer system for estimating an illumination spectrum of an image. The image is comprised of points of wavelength indexed spectral data and the wavelength indexed spectral data defines an input spectrum for each point of the image. The computer system comprises:
a processor to
determine for each point of a first set of points of the image a measure of variation in relation to the input spectrum of that point,
select one point from the first set based on the measure of variation for each point of the first set such that the variation in relation to the input spectrum of the selected one point of the first set is greater than the variation in relation to the input spectra of other points of the first set,
determine a cluster of points of the image based on the input spectrum of the selected one point of the first set, and
determine an estimate for the illumination spectrum based on the input spectra of points of the image in the cluster.

Optional features described of any aspect, where appropriate, similarly apply to the other aspects also described here.

An example will be described with reference to

Figure 4:
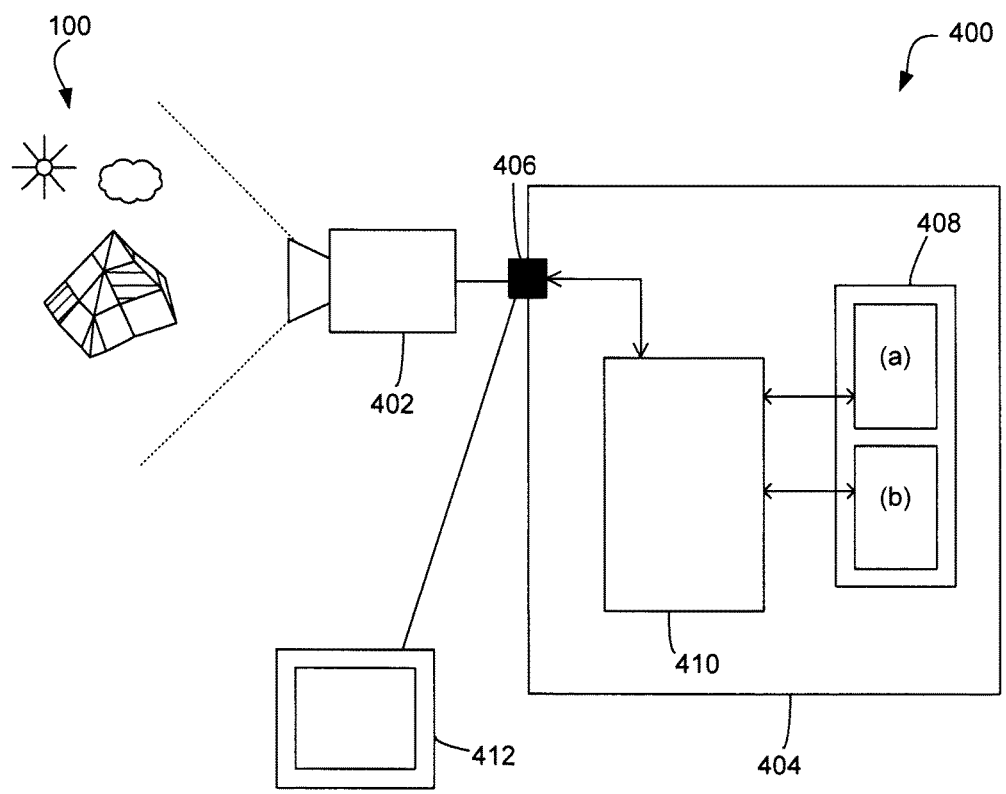

FIG. 4 illustrates a computer system for determining basis spectra of wavelength indexed image data.

Figure 5:
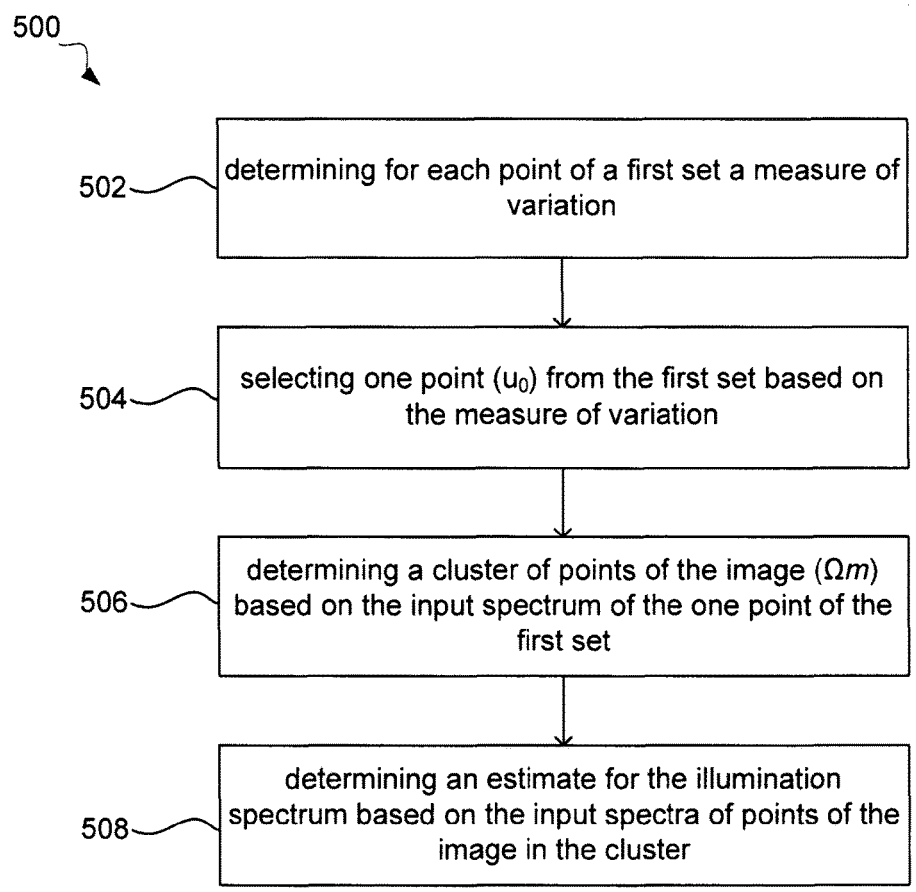

FIG. 5 illustrates a computer implemented method for estimating an illumination spectrum of an image.

Figure 6:
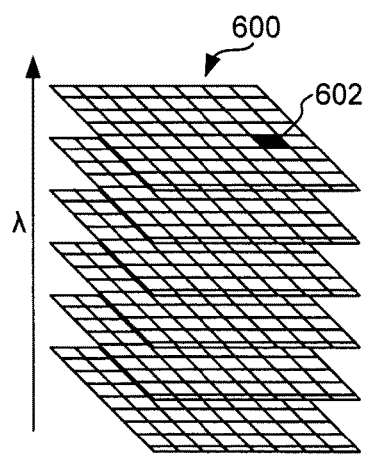

FIG. 6 illustrates a data structure for the multispectral image data.

Figure 7:
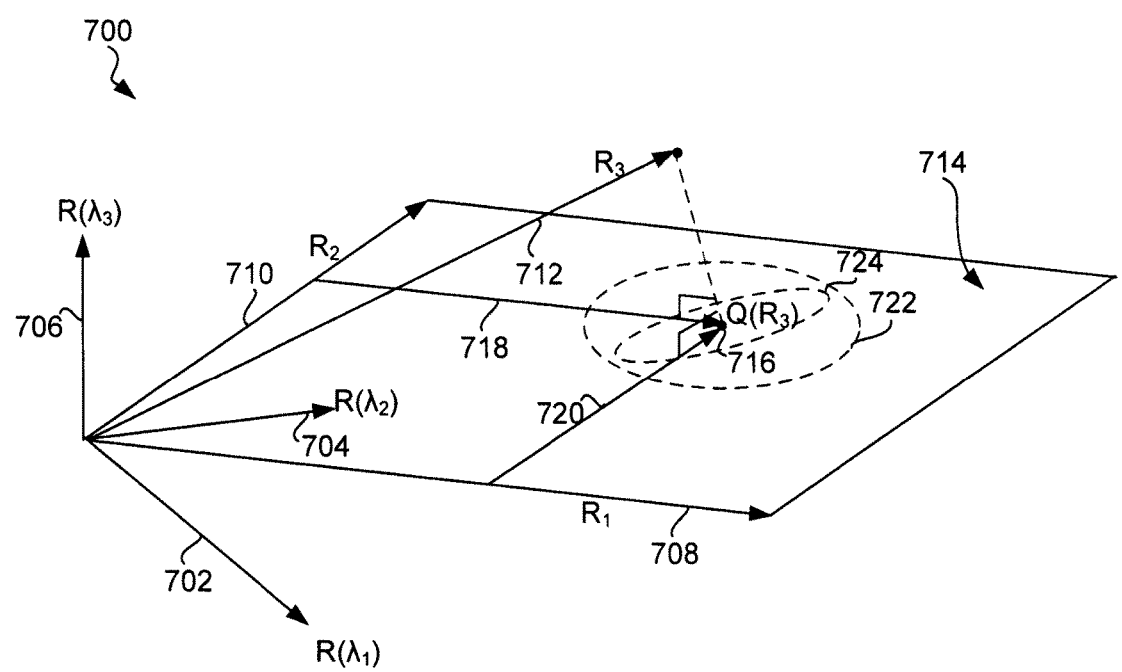

FIG. 7 illustrates a spectral space in a simplified example of three wavelengths.

Figure 8:
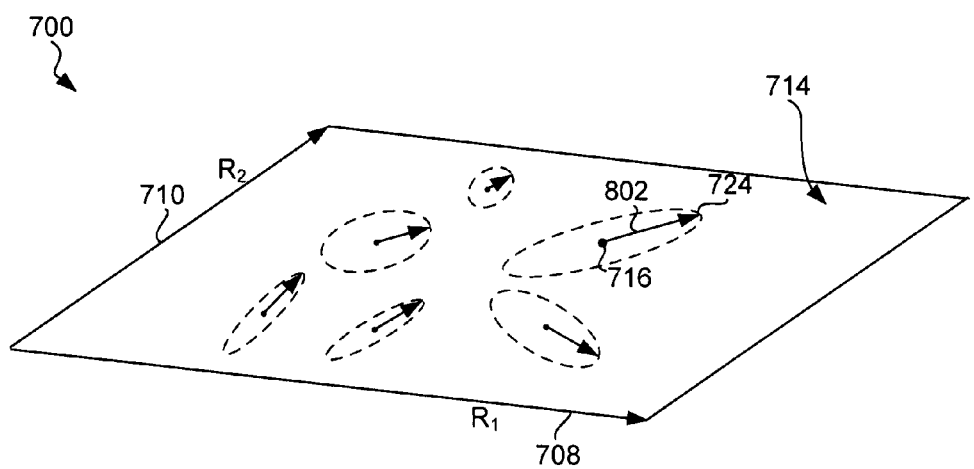

FIG. 8 illustrates a subspace of the spectral space of FIG. 7 and projections of six points onto the subspace.

Figure 9:
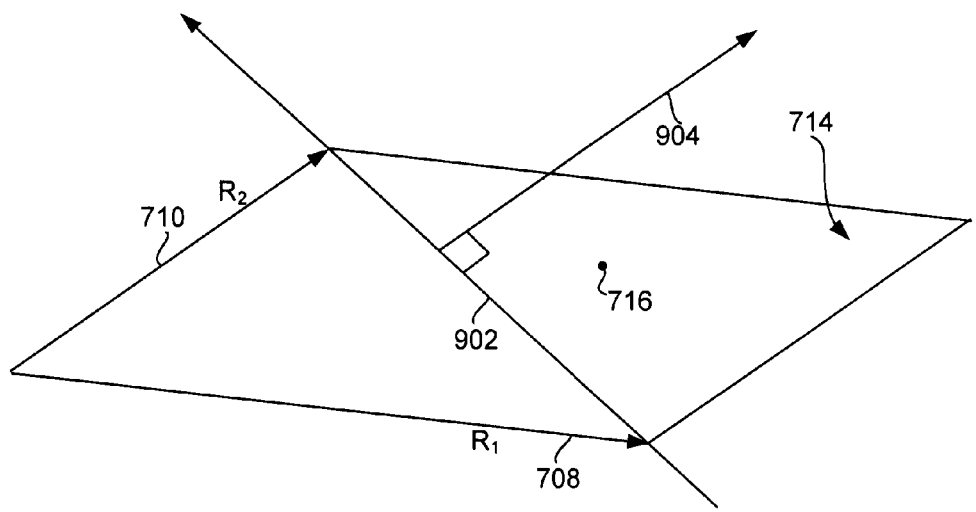

FIG. 9 illustrates the subspace of FIG. 8 and a direction such that the projection of randomly selected spectra onto this direction has the maximum variance.

Figure 10:
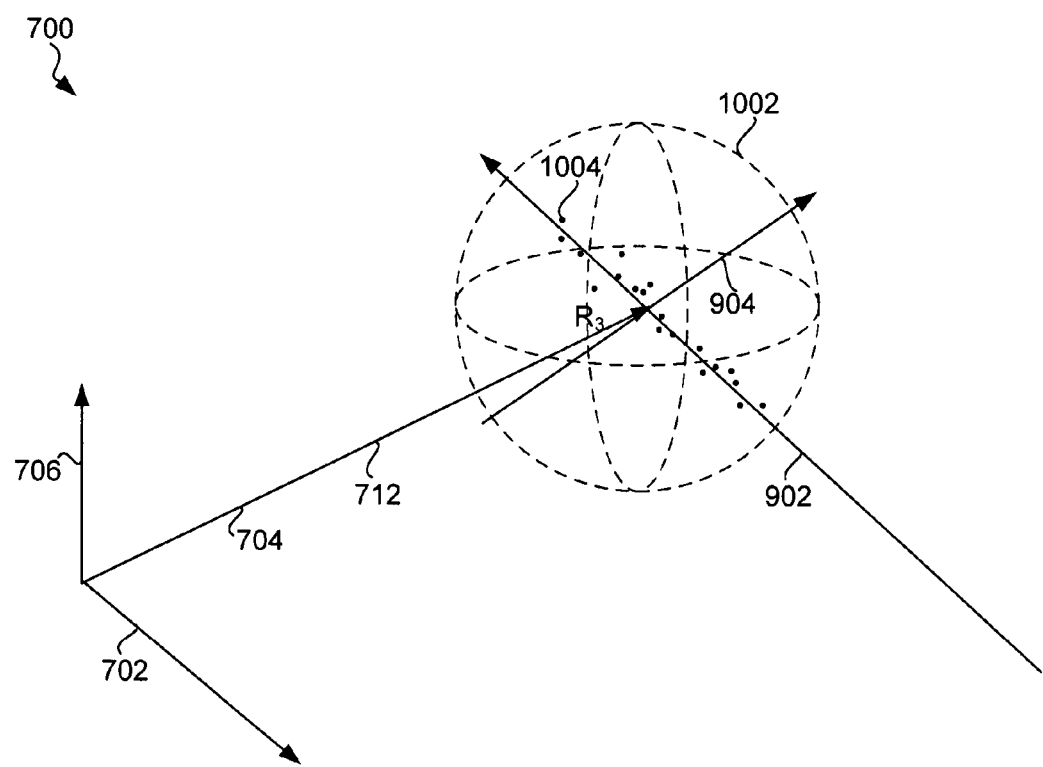

FIG. 10 illustrates the spectral space of FIG. 7 and a sphere indicating the threshold distance from the selected spectrum.

FIG. 11 illustrates a colour distribution of a real scene illuminated by three different light sources.

FIG. 12 illustrates an algorithm as executed by the processor of FIG. 4 for determining coefficients, pixels subsets and posterior probabilities.

FIG. 13 illustrates an algorithm as executed by the processor of FIG. 4 for initialising pixel clusters.

FIG. 14 illustrates an algorithm as executed by the processor of FIG. 4 for determining mixture coefficients, posterior probabilities and pixel subsets.

Figure 15:
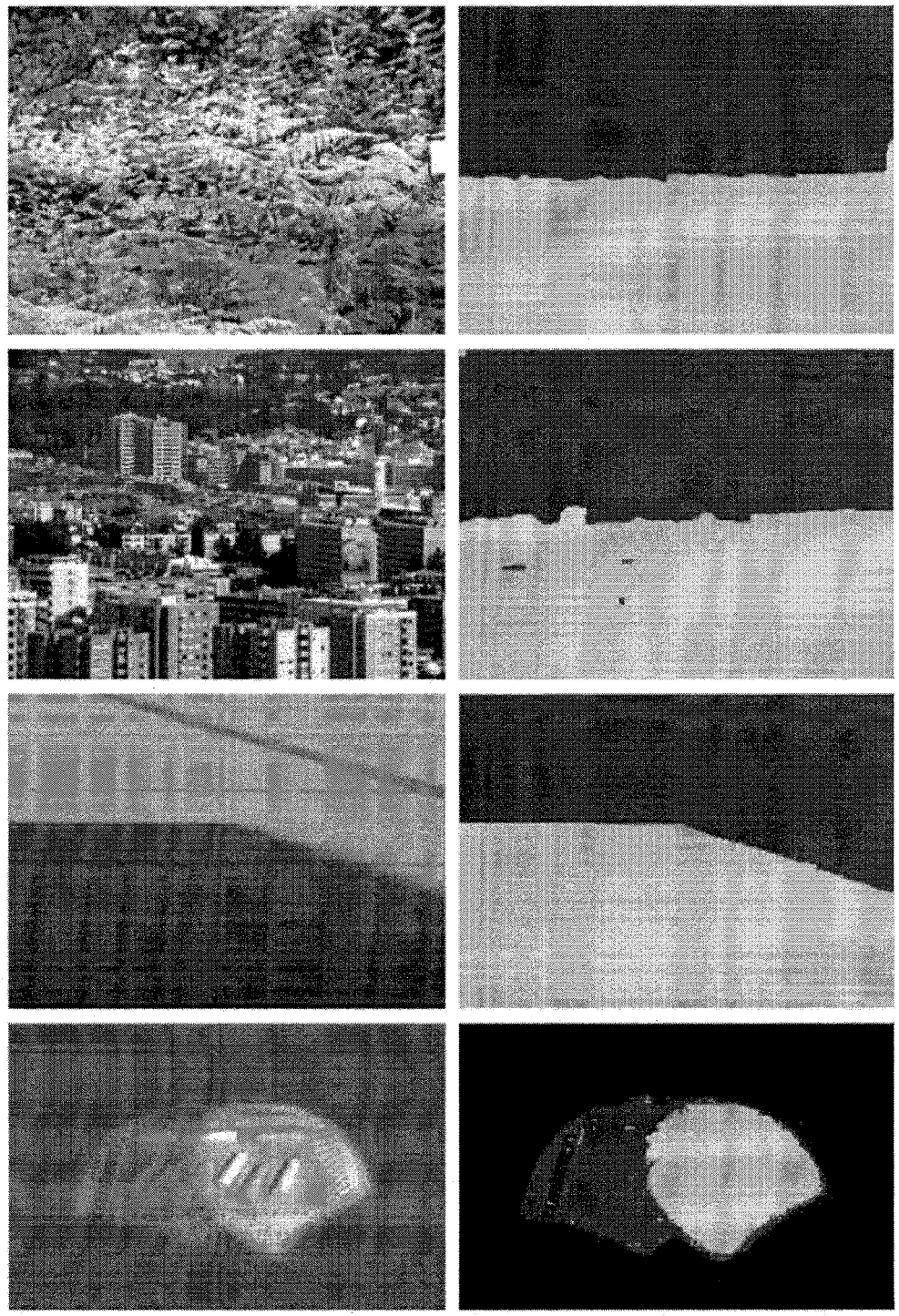

FIG. 15 illustrates a qualitative demonstration of the illuminant segmentation results.

Figure 16:
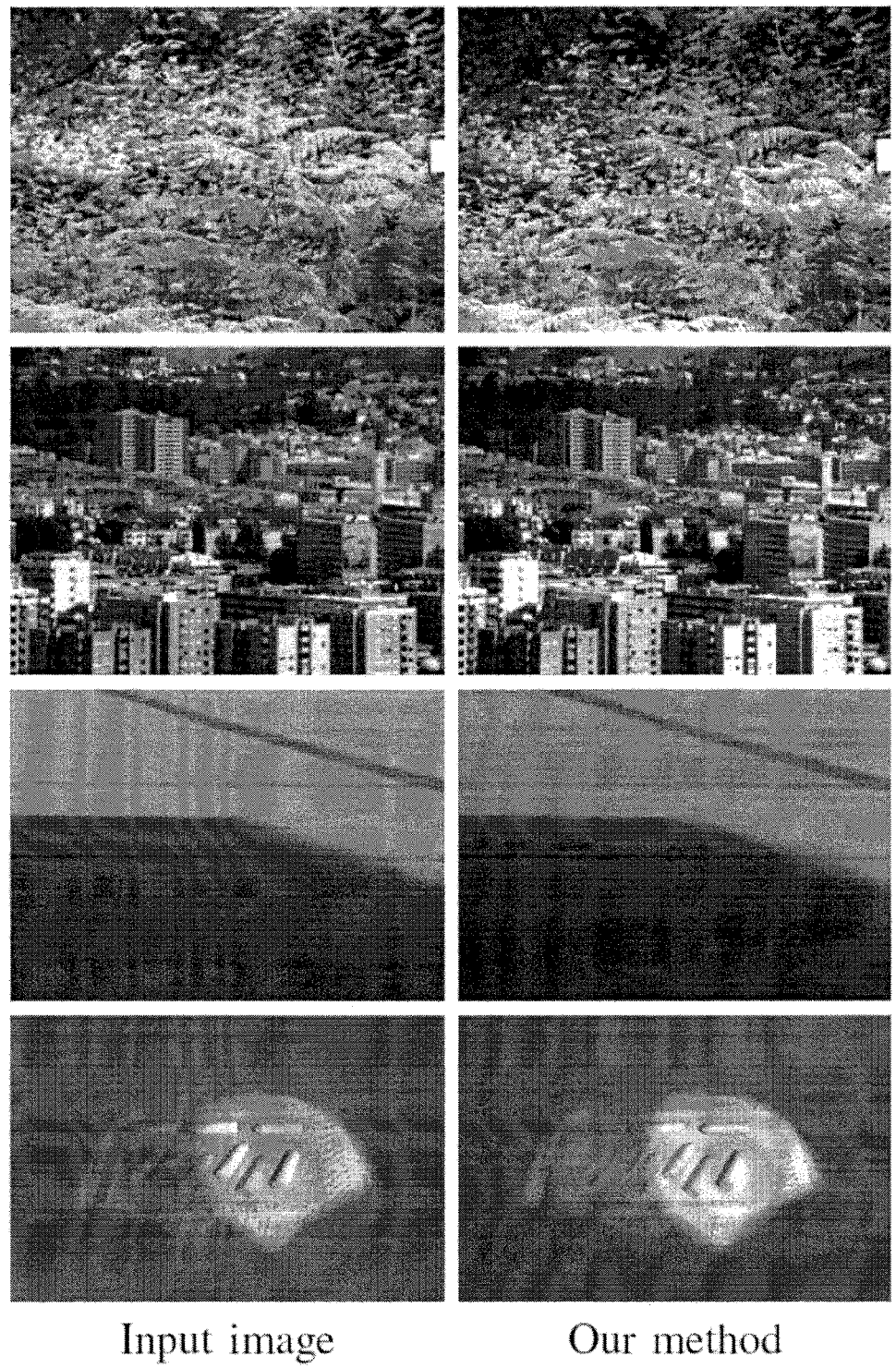

FIG. 16 illustrates colour correction results, that is, processed image data.

BEST MODE FOR CARRYING OUT THE INVENTION

Figure 1:
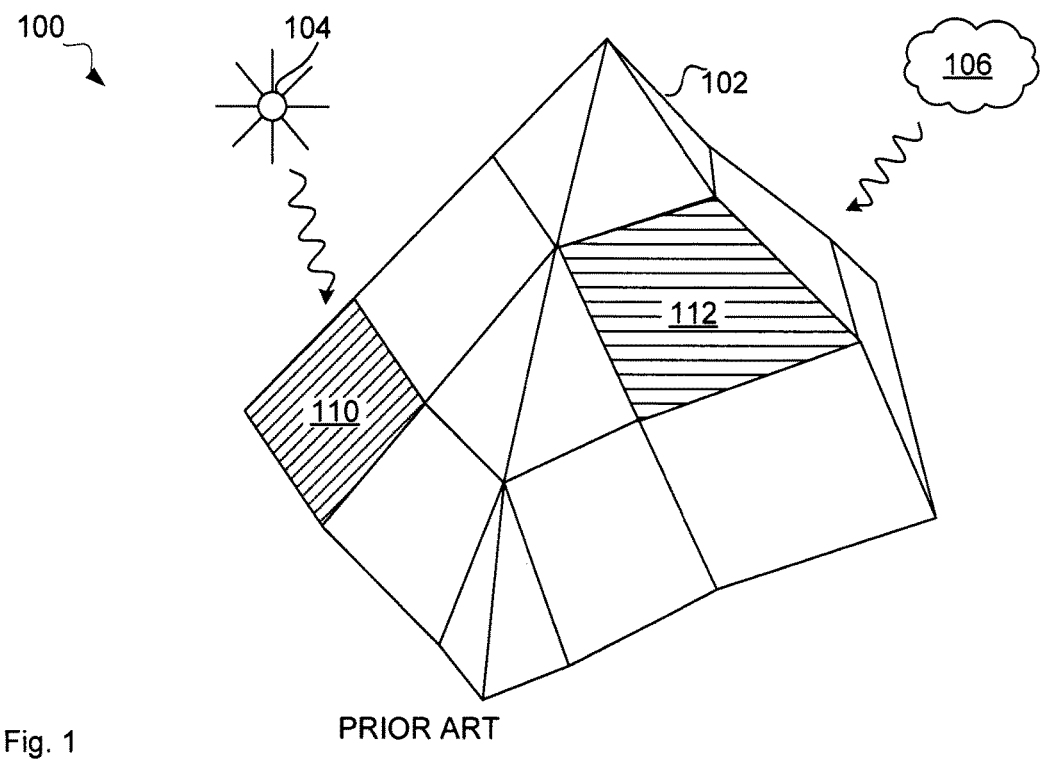
FIG. 1 illustrates an example scene (prior art).
Figure 2:
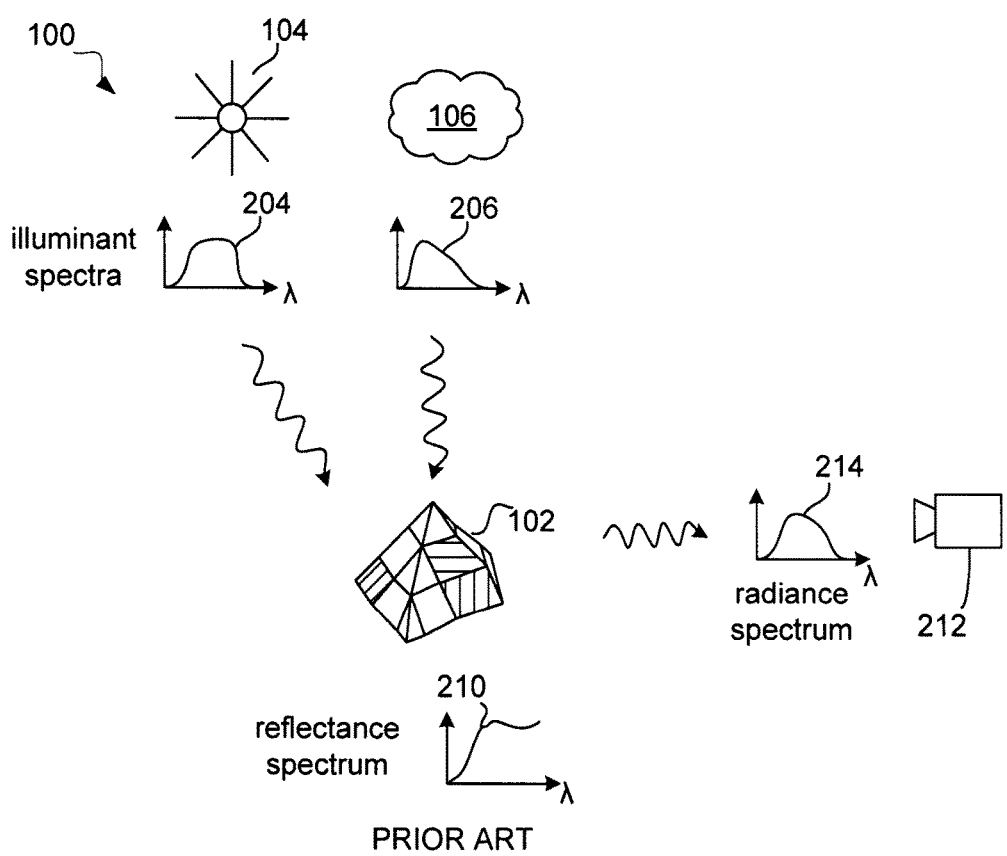
FIG. 2 illustrates the example scene of FIG. 1 in more detail (prior art).

FIG. 4 illustrates a computer system 400 for estimating an illumination spectrum of an image of scene 100. Computer system 400 comprises a sensor 402 and a computer 404. In this example the sensor 402 is a hyperspectral or multispectral sensor that is able to capture an image of a scene 100 illuminated by three light sources as explained with reference to FIG. 1.

In one example, the computer system 400 is integrated into a handheld device such as a consumer camera and the scene 100 may be any scene on the earth, such as a tourist attraction or a person. The sensor 402 may have a number of bands that balances computational costs with accuracy. The sensor 402 may have as low as four bands and as high as hundreds. In one example, sensor 402 is a Fluxdata camera FD-1665-MS7.

The computer 404 receives images from the sensor 402 via a data port 406 and the images are stored in local memory 408(b) by the processor 410. The processor 410 uses software stored in memory 408(a) to perform the method shown in FIG. 5. The program memory 408(b) is a non-transitory computer readable medium, such as a hard drive, a solid state disk or CD-ROM.

The processor 410 performs the method of estimating an illumination spectrum of the image. Processor 410 determines a measure of variation in relation to multiple points and selects one of the points as a starting point for a clustering step. Finally, processor 410 determines an estimate for an illumination spectrum for each cluster. Processor 410 may use the illumination spectra to perform white balancing or other image processing on the image and store an updated version of the image on the data store 408(b). In other examples, the processor 410 stores the white balancing data and/or the determined illumination spectrum on the datastore 408(b).

In one example, processor 410 performs on each cluster a method for estimating an illumination spectrum of an image as described in WO 2011/026167 "Illumination Spectrum Recovery", which incorporated herein by reference. Further, processor 410 may perform a method for decomposing hyperspectral or multispectral image data as described in U.S. Pat. No. 8,670,620 "Decomposing hyperspectral or multispectral image data", which incorporated herein by reference. For storing the input spectra, illumination spectra or other spectra the computer may employ the method described in WO 2009/152583 "Compact Representation of a Reflectance Spectrum" which is incorporated herein by reference.

The software provides a user interface that can be presented to the user on a monitor 412. The user interface is able to accept input from the user (i.e. touch screen). The user input is provided to the input/out port 406 by the monitor 412. The image is stored in memory 408(b) by the processor 410. In this example the memory 408(b) is local to the computer 404, but alternatively could be remote to the computer 404.

The processor 410 may receive data, such as image data, from data memory 408(b) as well as from the communications port 406. In one example, the processor 410 receives image data from the sensor 402 via communications port 406, such as by using a Wi-Fi network according to IEEE 802.11. The Wi-Fi network may be a decentralised ad-hoc network, such that no dedicated management infrastructure, such as a router, is required or a centralised network with a router or access point managing the network.

In one example, the processor 410 receives and processes the image data in real time. This means that the processor 410 determines the illuminant spectrum every time the image data is received from sensor 402 and completes this calculation before the sensor 402 sends the next image data update.

Although communications port 406 is shown as single entity, it is to be understood that any kind of data port may be used to receive data, such as a network connection, a memory interface, a pin of the chip package of processor 410, or logical ports, such as IP sockets or parameters of functions stored on program memory 408(a) and executed by processor 410. These parameters may be stored on data memory 408(b) and may be handled by-value or by-reference, that is, as a pointer, in the source code.

The processor 410 may receive data through all these interfaces, which includes memory access of volatile memory, such as cache or RAM, or non-volatile memory, such as an optical disk drive, hard disk drive, storage server or cloud storage. The computer system 404 may further be implemented within a cloud computing environment, such as a managed group of interconnected servers hosting a dynamic number of virtual machines.

It is to be understood that any receiving step may be preceded by the processor 410 determining or computing the data that is later received. For example, the processor 410 determines the image data, such as by filtering the raw data from sensor 402, and stores the image data in data memory 408(b), such as RAM or a processor register. The processor 410 then requests the data from the data memory 408(b), such as by providing a read signal together with a memory address. The data memory 408(b) provides the data as a voltage signal on a physical bit line and the processor 410 receives the image data via a memory interface.

FIG. 5 illustrates a computer implemented method 500 for estimating an illumination spectrum of an image as performed by processor 410. In other words, method 500 may serve as a blueprint or pseudo-code for software implemented in a particular programming language, such as C++, and stored on program memory 408(a) as compiled machine readable code. The image is comprised of points of wavelength indexed spectral data, such as multispectral image data.

Method 500 will be explained in broad terms first while a more detailed and more mathematical description follows afterwards.

FIG. 6 illustrates a data structure 600 for the multispectral image data. The data structure 600 comprises layers, one for each wavelength. Each layer represents the radiance values for one wavelength and all pixels and one example pixel 602 is highlighted. The values of pixel 602 for different wavelengths, that is the radiance values from lower layers at the same location as pixel 602, represent a radiance spectrum also referred to as the image spectrum or input spectrum. This input spectrum may be a mixture of multiple illumination spectra and the reflectance spectra of different materials present in the part of the scene that is covered by pixel 602.

In the following description, the term 'pixel' is replaced by 'point of the image' to denote that the individually addressable image elements may be computed based on multiple pixels. For example, the image resolution may be reduced by combining pixels and the method 500 is performed on the low-resolution image having multiple points instead of pixels. Unless noted otherwise, if the word 'pixel' is used it may equally be applicable to a 'point of the image'.

Referring back to FIG. 5, processor 410 commences performing method 500 by determining 502 for each point of a first set of points (denoted $\mathcal{J}_m \setminus \mathcal{K}_m$ below) of the image a measure of variation (denoted as σ(u) below) in relation to the input spectrum of that point. This step relates to step 10 of Algorithm 2 below. Determining a measure of variation in relation to an input spectrum may mean determining a variance of multiple input spectra in the neighbourhood of the input spectrum as explained below.

Starting with the first point of the first set, the processor 410 determines a further set of points in the neighbourhood of that first point of the first set and then determines the largest singular value of the centred distribution of these neighbourhood points. This largest singular value serves as a measure of variation around that first point of the first set.

Figure 3:
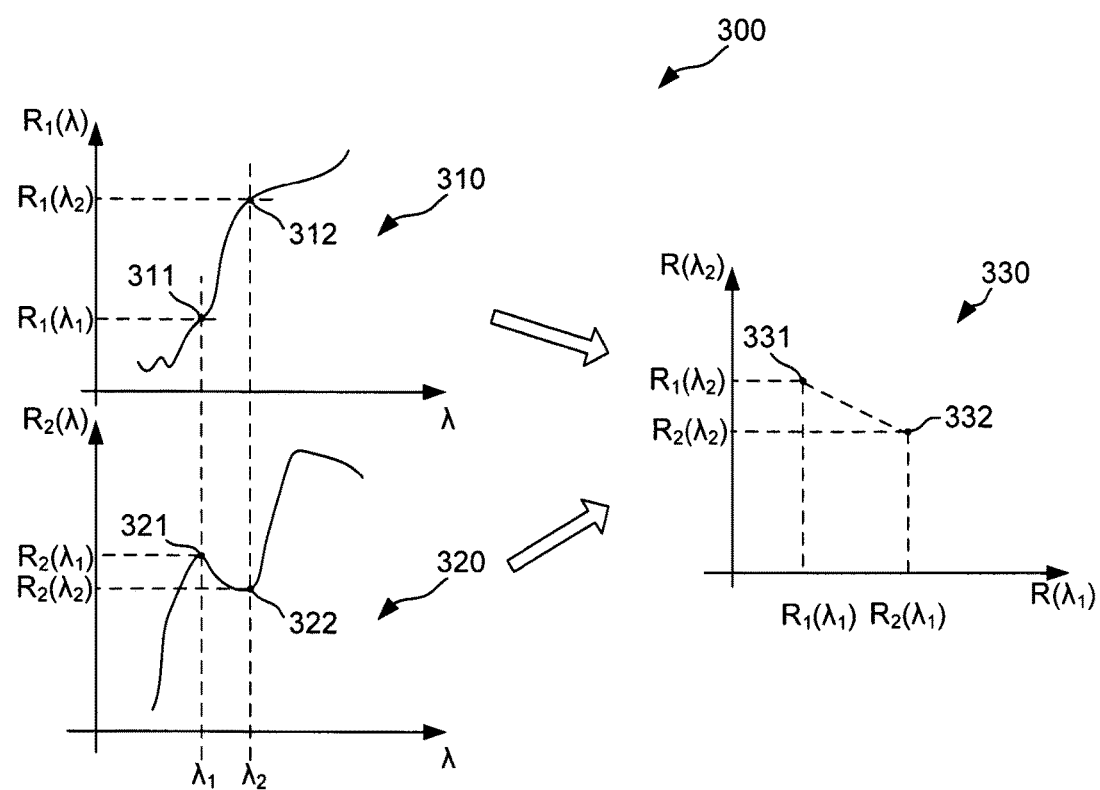
FIG. 3 illustrates the representation of radiance spectra in a spectral space.

As described above with reference to FIG. 3, the spectral space of the points of the image may have a large number of dimensions. As a result, a conventional distance measure has only limited applicability, which is also referred to as curse of dimensionality. This difficulty may be addressed by using a modified distance measure, which defines the distances between points with respect to a projection onto a lower-dimensional subspace.

FIG. 7 illustrates a spectral space 700 in a simplified example of three wavelengths. Space 700 is spanned by three axes 702, 704 and 706, which is similar to FIG. 3 but with one more dimension. As mentioned above, typically, the number of dimensions is greater than three, such as one hundred, which is difficult to illustrate graphically.

Spectral space 700 comprises input spectra of three pixels $R_1$, $R_2$ and $R_3$ referenced as 708, 710 and 712, respectively. The three radiance values 708, 710 and 712 are three dimensional because the image values are sampled at three wavelengths and therefore, the spectral space 700 is three-dimensional. As can be seen, the difference between two input spectra, such as spectrum 708 and 710 would be measured as the distance in three dimensions, which becomes difficult for a large number of dimensions.

In this example, a first set of points of the image is defined and includes only the third point with third input spectrum 712.

Input spectra 708 and 710 constitute a second set of points and span a two-dimensional subspace 714 (step 4 of Algorithm 2). It is noted that the dimensionality of the subspace 714 depends on the number of points in the second set that span this subspace. This is in contrast to the spectral space 700 where the number of wavelengths at which the image is sampled defines the number of dimensions.

It is noted that the first set and the second set are disjoint, which means that no point of the image is in both sets and that the intersection of the first and the second set is empty.

The input spectrum 712 of the first set can be projected onto subspace 714 spanned by the second set resulting in projection 716 that is completely defined by a first length 718 in the direction of the first input spectrum 708 and a second length 720 in the direction of the second input spectrum 710 (step 5 of Algorithm 2). As a result, the difference between the projection 716 and the two input spectra 708 and 710 or any other point projected onto subspace 714 can be computed in two dimensions instead of three dimensions before.

The outcome of the method may depend on the selection of input spectra 708 and 710 of the second set to span the subspace 714. In one example, processor 410 selects the input spectra of the second set randomly from all points of the image (step 3 of Algorithm 2). The number of dimensions of the subspace may depend on the number of dimensions of the original spectral space 700 and in one example, processor 410 reduces the number of dimensions by a factor 10, such as randomly selecting 10 input spectra if 100 different wavelengths are sampled.

In another example, processor 410 randomly selects 10% of the remaining points as the second set, that is, points that are not yet assigned to one cluster. In some examples, the number of selected points in the second set and therefore the number of dimensions in the subspace 714 is equal to M which is the number of illuminants or clusters. Advantageously, the dimensions of the spectral space 700, that is the number of wavelengths of the multispectral image, is greater than the number of illuminants.

For each of the input spectra that were not randomly selected, such as input spectrum 712, processor 410 finds a third set of points having input spectra in the neighbourhood of input spectrum 712 projected onto subspace 714 (step 7 in Algorithm 2). The neighbourhood may be defined by all pixels that lie within a predetermined distance (referred to as c below), which is indicated by circle 722 in FIG. 7. This means all input spectra for which the projection onto subspace 714 is inside circle 722 belong to the neighbourhood of input spectrum 712 and are therefore elements of the third set.

Processor 410 determines the measure of variation in relation to the input spectrum 712 by subtracting the mean value of all spectra in the neighbourhood 722 (steps 8 and 9 in Algorithm 2) and then determining the largest singular value of the resulting centred distribution/matrix of the neighbours (step 10 of Algorithm 2). The measure of variation may be represented as the length of the major axis of ellipse 722.

This step is repeated such that processor 410 determines the measure of variation in relation to the input spectra of each point of the first set.

FIG. 8 shows the result in the same spectral space 700 as in FIG. 7 with the first set having six points in this example. FIG. 8 shows the subspace 714 and the projection of the six points of the first set, such as point 716, onto the subspace 714. The measure of variation for each point is indicated by an arrow, such as example arrow 802 also indicating the major axis of the respective ellipse 724. In the example of FIG. 8, processor 410 has computed six measures of variation in relation to the input spectrum of each of the six respective points of the image.

Referring back to FIG. 5, processor 410 selects 504 one of the six points in FIG. 8 (denoted $u_0$ below) based on the measure of variation of each of the six points (step 12 of Algorithm 2). Processor 410 selects that point such that the variation in relation to the input spectrum of the selected point is greater than the variation in relation to the input spectrum of the other five points. In one example, processor 410 selects the point with the maximal variation, which is point 716 in FIG. 8 because that point has the longest major axis of the respective ellipse 724. Processor 410 takes the original input spectrum of point 716 before the projection, that is input spectrum 712 in FIG. 7 as the first element of a first cluster associated with a first illuminant.

Processor 410 the determines 506 a cluster of points of the image (denoted $\Omega_m$ below) based on the input spectrum 712. Processor 410 may employ existing methods of cluster growing or first determine additional members of that cluster as follows.

FIG. 9 again illustrates the spectral space 700 and a first direction 902 (denoted by $V_m$ below) determined by processor 410 such that the projection of the randomly selected spectra 708 and 710 of the second set onto this direction 902 has the maximum variance (step 13 of Algorithm 2). In this example of only two randomly selected spectra 708 and 710, the direction 902 simply connects the two spectra 708 and 710. However, in typical applications more than two spectra are selected and the direction 902 is determined such that the variance of the projection of the randomly selected points onto this direction is maximised.

The processor 410 then determines a further subspace 904 of subspace 714 that is orthogonal to direction 902 (step 14 of Algorithm 2). It is noted that while further subspace 904 is one dimensional, that is, a line, in most applications the further subspace 904 has more dimensions (but direction 902 remains one dimensional). Processor 410 adds spectra to the cluster which are within a predefined distance (denoted as $\epsilon_2$ below) in the original spectral space 700 such that the distance between a projection of the average spectrum of that cluster onto further subspace 904 and the projection of initial cluster spectrum 712 onto the further subspace 904 is below a predetermined threshold (denoted as $\epsilon_3$ below) (step 15 of Algorithm 2). It is noted that the distance may be expressed as a difference to the input spectrum of point 716 based on the projection onto subspace 714. In one example, the thresholds $\epsilon_1$, $\epsilon_2$, $\epsilon_3$ are set such that, based on the distance in the respective space (subspaces 714, spectral space 700 and further subspace 904), the closest 10% among the remaining pixels are chosen as the neighbours of the pixel under consideration.

FIG. 10 illustrates the spectral space 700 and a sphere 1002 indicating the threshold distance from the selected spectrum 712 from the first set. In other words sphere 1002 indicates points with a constant difference to the input spectrum of the selected point 712 of the first set. Pixel input spectra that are added to the cluster are indicated by solid discs, such as 1004. As can be seen in FIG. 10, the selected input spectra are concentrated along direction 902 which was achieved by limiting the distance of their projections onto further subspace 904.

After these points are added to the cluster, processor 410 repeats the above steps 502, 504, and 506 of method 500 to determine a predetermined number of clusters. Processor 410 may grow these clusters based on a measure of similarity as described further below.

Finally, processor 410 determines 508 an estimate for the illumination spectrum based on the input spectra of points of the image in the cluster.

This disclosure provides an unsupervised method for segmenting the illuminant regions and estimating the illumination power spectrum from a single image of a scene lit by multiple light sources. Here, illuminant region segmentation is cast as a probabilistic clustering problem in the image spectral radiance space 700.

We formulate the problem in an optimisation setting which aims to maximise the likelihood of the image radiance with respect to a mixture model while enforcing a spatial smoothness constraint on the illuminant spectrum. Processor 410 initialises the illuminant for each pixel via a projection of the image radiance spectrum 712 onto a low-dimensional subspace 714 spanned by a randomly chosen subset of spectra 708 and 710.

Subsequently, processor 410 optimises the objective function in a coordinate-ascent manner by updating the weights of the mixture components, the sample pixel set under each illuminant and the illuminant posterior probability. Processor 410 then estimates the illuminant power spectrum per pixel by applying colour constancy methods to each of these pixel clusters.

Most existing algorithms do not contain a robust mechanism to distinguish illumination changes from reflectance variations. Further, the uneven nature of the shading over the surface often adversely affects the stability of the results.

In this disclosure, we present an unsupervised method for the segmentation of illumination regions and the estimation of the illuminant power spectrum in a scene lit by multiple light sources. This method is one of the few that are able to handle uncontrolled illumination in real-world environments using only input from a single image. Unlike supervised methods, it does not involve complicated setups for learning prior knowledge of colour constancy algorithms from a training dataset. Moreover, the method is applicable to a wide variety of natural scenes.

To solve the problem, we make the following assumptions:

We assume the radiance spectra at pixels illuminated by the same illuminant follow a log-concave distribution. Such a condition does not overly restrict the applicability of our method to real-world scenes since log-concave probability distributions include a wide variety of densities such as the Normal, Beta, Gamma, Subbotin, Logistic and Laplace distributions. Moreover, our approach is not limited to Lambertian reflectance or Munsell spectra, being applicable to general real-world scenes.

We assume that the illumination power spectrum is piecewise constant or slowly varying across image regions. This local smoothness assumption permits the enforcement of the spatial consistency of illumination in natural images and has been introduced to cope with cases where the radiance spectra within small isolated image patches with purely saturated hues do not fit the radiance distribution of the surrounding pixels. Note that, without the spatial smoothness assumption, these patches would be labelled as being illuminated by separate illuminants. Hence, this assumption prevents the presence of isolated illumination regions resulting from these patches. Moreover, this spatial assumption does not imply the spectral smoothness of the illuminant spectrum. Rather, the resulting illuminant segments are formed due to the differences between the sets of radiance spectra under each illuminant.

Here, we view the problem of segmenting illumination regions as a clustering one with respect to a mixture model. Processor 410 performs the clustering process in an iterative manner where processor 410 initialises the algorithm with an effective separation of the illuminant regions based on the projection onto random subspaces as explained with reference to FIG. 7.

To this end, processor 410 employs a kernel density estimator [37] to approximate the likelihood of the image irradiance occurring under a particular light source. In addition, the local smoothness constraint on the illuminant allows the correction of spatial discontinuities across the resulting illumination regions. Subsequently, the average illuminant for each region is computed by applying colour constancy methods used elsewhere for single light source scenes, such as Grey-World [7], Grey-Edge [44] and White-Patch [28].

Finally, processor 410 determines a per-pixel estimation of the illuminant spectrum as the weighted average of the illuminant per region, where the weights are the posterior probabilities of the illuminant at each pixel.

Therefore, this disclosure provides a means for segmenting a scene into illumination regions. Method 500 is designed in such a way that any colour constancy method for estimating a single illuminant colour can be employed to recover an estimate of the local illumination in each region.

This confers several advantages over previous works. Firstly, the number of illuminants and their colours do not need to be pre-determined. This contrasts with other approaches. In fact, one can initialise method 500 with a sufficiently large number of illuminants and the method will eventually converge to a minimal number of distinctive light sources. Secondly, method 500 does not require user-intervention. Being completely unsupervised sets it apart from other methods. In addition, the illumination colour can be segmented without sampling image patches. As a result, the illuminant colour is independent of the sampling strategy and the patch size. Furthermore, by estimating the illumination boundaries, method 500 avoids the risk of over-smoothing the illuminant spectra, which is an issue encountered by local-averaging methods.

In the following part of the disclosure, we examine the structure of the radiance spectra in a scene illuminated by multiple light sources. The idea is to view the illuminant segmentation problem as a clustering one in the spectral radiance space. To commence, we depart from the image formation process for a single illumination setting. Let us consider a location u in the scene that is illuminated by a spatially uniform power spectrum $L(\lambda)$, where $\lambda$ is the wavelength variable. The spectral radiance $I(u,\lambda)$ reflected from that location can be expressed as $$I(u,\lambda) = L(\lambda)S(u,\lambda), \quad (1)$$

where $S(u,\lambda)$ is the reflectance function the at location u and the wavelength $\lambda$.

Each surface reflectance $S(u,\lambda)$ may be expressed as a weighted sum of wavelength-dependent basis functions $S_i(\lambda)$. This model is expressed as $$S(u,\lambda) = \sum_i w_i(u)S_i(\lambda), \quad (2)$$

where the basis functions can be obtained via Principal Component Analysis (PCA) or Independent Component Analysis (ICA).

Combining Equation 1 and 2, the scene radiance can be written as a linear combination of the basis radiance spectra as follows $$I(u,\lambda) = \sum_i w_i(u)B_i(\lambda), \quad (3)$$

where $B_i(\lambda) = L(\lambda)S_i(\lambda)$ is the spectral radiance of the $i^{th}$ basis component.

Equation 3 implies that the radiance of all real-world materials under a fixed illuminant spectrum form a linear subspace spanned by the basis vectors $B_i(\cdot)$.

Furthermore, here we note that each basis vector $B_i(\cdot)$ is dependent on the illuminant spectrum $L(\cdot)$. As a consequence, the subspace spanned by the vectors $B_i(\cdot)$ is skewed by the illuminant spectrum and so is its principal orientation in the spectral radiance space.

The observation above is illustrated in FIG. 11. In the left panel, we show a sample hyperspectral image rendered in colour as yielded by the standard colour matching functions proposed by Stiles and Burch [42]. The right panel shows three clusters of trichromatic colour vectors, each for an illumination region. These have been plotted in a three dimensional coordinate system where the axes represent the R, G and B values in the range between 0 and 255.

The hyperspectral image has been acquired in the visible wavelength range between 400 and 700 nm at every 10 nm in the spectral domain. Computer system 400 acquires the image using an hyperspectral camera equipped with Liquid Crystal Tuneable Filters (LCTFs) as sensor 402. We illuminated the input scene using three illuminants with different spectral power distributions corresponding to blue, orange and yellow hues in a spatially overlapping fashion in the scene.

Note that the irradiance in the hyperspectral image is approximately linear with respect to the scene radiance. Thus, the simulated colour values are linear combinations of the spectral bands, with weights being the spectral sensitivity of the standard colour matching functions. As a result, the colour image shown in the left panel is linearly related to the scene radiance spectrum, being akin to RAW imagery captured by digital colour cameras without further processing. For the sake of visualisation, we have quantised the image to an 8-bit dynamic range. To enhance the visibility of dark regions, we have used intensity bracketing, therefore inevitably creating saturated pixels.

The right-hand panel shows the clusters of colour vectors at all the image pixels in the RGB colour space, which are labelled in different colours according to the local illuminant. Note that these colour vectors indeed form clusters in the spectral radiance space with orientations skewed by the respective illuminant. This is the basis observation for our clustering approach, allowing for the separation of pixels illuminated by each light source.

Illuminant Segmentation and Estimation

We now consider the problem of segmenting and estimating the spatially varying illuminant spectra in the scene. We would like to stress that, although the following derivation takes the number of scene illuminants as input, it is, in general, not a requirement for method 500. In fact, the number of illuminants can be estimated by a pre-processing step akin to that in [22].

Although the method in [22] specifically deals with a specific form of multi-modal probability distributions, i.e. the mixture of Gaussian distributions, it can be generalised to any multi-modal distribution. In relation to our problem setting, this processing step also applies to the non-parametric model of radiance spectrum distribution we describe below. In our implementation, method 500 commences with a sufficiently large number of illuminants. Illuminants found to be similar in terms of their angular difference are then merged and their contributions to each pixel are consolidated at the end of the algorithm.

As before, we assume that the illuminant power spectrum varies smoothly in the spatial domain. This assumption permits the computation of each component illuminant by standard colour constancy algorithms. Such assumption also gives rise to a sampling approach which yields pixel subsets illuminated by each illuminant.

Objective Function

We formulate the target function of the clustering problem as follows. Firstly, we denote the spectral radiance vector at pixel u as $I(u) \triangleq (I(u,\lambda_1), I(u,\lambda_2), \ldots, I(u,\lambda_K))$, where $\lambda_k$'s, $k=1, \ldots, K$, are the sampled wavelengths of the image. Here, we consider a scene illuminated by M illuminants $L_1$, $L_2, \ldots L_M$ and denote $\alpha_m$ as the mixing coefficient of radiance spectrum distribution under the $m^{th}$ illuminant. The mixing coefficients $\alpha_m$, $m=1, \ldots, M$ indicate the prior probability of the $m^{th}$ illuminant and satisfy the conditions $\Sigma_{m=1}^{M}\alpha_m=1$ and $\alpha_m \geq 0$, $\forall m=1, \ldots, M$. In addition, we denote the cluster of pixels illuminated by the $m^{th}$ illuminant as $\Omega_m$, where $\Omega_i \cap \Omega_j = \emptyset \forall i \neq j$, and the union of these as $\Omega \triangleq \cup_{m=1}^{M} \Omega_m$.

Processor 410 finds the clusters $\Omega_1, \Omega_2, \ldots, \Omega_M$ that maximise the likelihood of the input image radiance. Here, we formulate the likelihood of the spectral radiance vector $I(u)$ given the pixel clusters as $$p(I(u) \mid \Omega) = \sum_{m=1}^{M} \alpha_m p_m(u), \tag{4}$$

where $p_m(u) \triangleq p(I(u)|\Omega_m)$ is the probability density function (PDF) of the radiance vector $I(u)$ given the set of pixels $\Omega_m$ illuminated by the $m^{th}$ illuminant.

Here, we approximate this PDF using kernel density estimation [37]. To this end, we rely on a kernel function $K_h(\bullet)$ with bandwidth h. This function aims to express the probability density of a radiance spectrum $I(u)$ in terms of its distances to the radiance spectra of the sample pixels in $\Omega_m$. Formally, the kernel density estimate of PDF $p_m(u)$ is given by $$p_m(u) \approx \frac{1}{n_m h} \sum_{v \in \Omega_m} K_h(\|I(u) - I(v)\|), \tag{5}$$

where $n_m = |\Omega_m|$ is the number of sample pixels illuminated by the $m^{th}$ illuminant and $\|\bullet\|$ is the $L^2$-norm of the vector argument.

Combining Equations 4 and 5, we can rewrite the likelihood of the spectral radiance vector $p(I(u))$ as $$p(I(u) \mid \Omega) \approx \sum_{m=1}^{M} \frac{\alpha_m}{n_m h} \sum_{v \in \Omega_m} K_h(\|I(u) - I(v)\|), \tag{6}$$

where the kernel function penalises large arguments, i.e. it attains a peak when the argument value is near zero and vanishes when the latter exceeds the kernel width. Examples of kernel functions include the Gaussian kernel function, which is expressed as $$K_h^G(z) = \frac{1}{\sqrt{2\pi}} \exp\left(-\frac{z^2}{2h^2}\right) \tag{7}$$

and the Epanechnikov kernel [40]

$$K_h^E(z) = \begin{cases} \frac{3}{4}\left(1 - \frac{z^2}{h^2}\right) & \text{if } |z| \leq h \\ 0 & \text{otherwise} \end{cases} \tag{8}$$

Further, processor 410 enforces an additional constraint that imposes the smooth spatial transition of the illumination in the scene. This is because it is often the case that the illumination changes smoothly rather than arbitrarily across the spatial domain of naturally occurring scenes. This implies that the contribution of the constituting illuminants at each pixel varies smoothly. As a result, we introduce a smoothness constraint on the posterior probability $p(L_m|I(u))$ over the spatial domain $\mathcal{I}$. Such a constraint can be formulated as minimising the following gradient norm of the posterior probability $$\mathcal{R} = \sum_{u \in \mathcal{I}} \sum_{m=1}^{M} \left(\frac{\partial p(L_m \mid u)}{\partial x}\right)^2 + \left(\frac{\partial p(L_m \mid u)}{\partial y}\right)^2, \tag{9}$$

where x and y are the coordinates of the pixel u.

Equation 9 states the general smoothness constraint on the continuous spatial domain. To express this constraint over the image lattice, we consider a neighbourhood $\mathcal{N}(u)$ around the pixel u. We then discretise the above equation in terms of the difference of the posterior probability $p(L_m|\bullet)$ between the pixel u and its neighbour v, which yields $$\mathcal{R}^* = \sum_{m=1}^{M} \sum_{u \in \mathcal{I}} \sum_{v \in \mathcal{N}(u)} [p(L_m \mid u) - p(L_m \mid v)]^2, \tag{10}$$

Therefore, the illuminant recovery and segmentation problem is cast as a maximisation of the log likelihood of the image radiance spectra subject to the minimisation of the spatial variation of illuminant contributions. Thus, we formulate the objective function as a combination of the log likelihood, i.e. the data error term, and the spatial variation of the posterior probability of illuminants, i.e. the regularisation term. Hence, our problem amounts to finding the mixing coefficient $\alpha_m$ and the (maximal) sample set of pixels $\Omega_m$ for the $m^{th}$ illuminant so as to maximise the function $$F = \sum_{u \in \mathcal{I}} \log p(I(u) \mid \Omega) - \beta \mathcal{R}^*, \tag{11}$$

where $\beta \geq 0$ is the Lagrangian multiplier of the regulariser $\mathcal{R}^*$.

In the following part of the disclosure, we present an iterative approach aimed at maximising the cost function in Equation 11. At each iteration, processor 410 re-estimates the weight $\alpha_m$'s and expands the subset of pixels $\Omega_m$ so as to maximise the cost function above. Processor 410 updates these two variables by considering the similarity between the pixel radiance spectra in the scene. Meanwhile, the spatial smoothness constraint propagates illuminant labels to neighbouring pixels.

FIG. 12 illustrates Algorithm 1 as performed by processor 410 comprising the steps of method 500 in the form of pseudocode. Herein, we have opted to follow the natural progression of the algorithm, first describing the initialisation of the pixel sets $\Omega_1, \Omega_2, \ldots, \Omega_M$. We then turn our attention to the optimisation process and the convergence criterion.

Processor 410 optimises the cost function in Equation 11 using a coordinate ascent approach [36]. This comprises optimising the target function with respect to the illuminant cluster parameters in an iterative manner. Here, we model the distribution of pixel radiance spectra illuminated by multiple lights as a mixture of several components. Processor 410 selects initial samples from each of these components (clusters) that correspond to each of the illuminants in the scene. The initialisation procedure is derived from the component separation method described by Kannan et al. [25]. As before, we make a weak assumption that the radiance spectra at pixels illuminated by the same light follow a log-concave distribution. In fact, log-concave densities cover a wide range of commonly occurring distributions such as Gaussians and the exponential family. Therefore, this assumption does not overly restrict the applicability of our method to real-world scenes.

The algorithm is based on a theorem that for any mixture of log-concave distributions, the Singular Value Decomposition (SVD) subspace of sample points is close to the means of the samples from the mixture components, where "close" is defined in terms of the sample variances. Further, the method hinges on the intuition that the distance between a point and the mean of its component distribution can only shrink upon projection, thus magnifying the ratio of inter-component to intra-component distances.

Following this intuition, the method employs a random projection of the input points onto a lower dimensional subspace of the original space. At each point (e.g. projected radiance spectrum) in this subspace, processor 410 computes the principal variance 802 over its neighbourhood 722 in FIGS. 7 and 8, which is the largest one along all the directions in W.

The point with the maximal principal variance is deemed to belong to the sparsest part of its distribution. Using this extremal point as a reference, processor 410 can initially select pixels belonging to the same distribution of radiance spectra as this reference point by a distance criterion. Specifically, this criterion involves applying a threshold to the ratio of the distance between the given points and the extremal point to the standard deviation of the neighbourhood in the subspace. The threshold may be related to the number of components and the input sample size.

FIG. 13 illustrates Algorithm 2, which summarises the initialisation of our method performed by processor 410. Throughout the pseudocode in Algorithm 2 we use the symbol |.| to denote the cardinality of a set, ||.|| is the $L^2$-norm, $\Pi_X(.)$ as the projection operator onto a subspace X, Var(.) is the variance operator and $\epsilon_1, \epsilon_2$ and $\epsilon_3$ are constants. It is noted here that the values for $\epsilon_1, \epsilon_2$ and $\epsilon_3$ may be different for each image. In the equations below if points are selected such that the norm is less than $\epsilon_1, \epsilon_2$ or $\epsilon_3$, this may be replaced by selecting the points with the lowest norm up to a predefined number of points. For example, the expressions containing $\epsilon_1, \epsilon_2$ and $\epsilon_3$ as a threshold for a norm may be replaced by selecting 10% of points with the smallest value for that norm.

The initialisation takes place over M iterations, in each of which processor 410 selects a subset of sample pixels $\Omega_m$ that are representative of the component distribution corresponding to the $m^{th}$ light also referred to as cluster above. At the beginning of each iteration, processor 410 randomly samples the second set of pixels $\mathcal{K}_m$ (708 and 710 in FIG. 7) from the unassigned pixels $\mathcal{J}_m$ in the image, i.e. those pixels that have not been sampled at previous iterations, as shown in Line 3, that is, processor 410 excludes from the points of the image the cluster of points from a previous iteration.

Subsequently, processor 410 obtains the projection $Q(u)$ 716 onto the M-dimensional subspace $W_m$ 714 spanned by the radiance spectra 708 and 710 at the pixels in the second set $\mathcal{K}_m$ as shown in Line 5. At this stage, the random subset $\mathcal{K}_m$ used to obtained the low-dimensional subspace is discarded from $\mathcal{J}_m$ to ensure that the samples selected for each component are independent from $W_m$, that is, the first set and the second set are disjoint. Later, as shown between Lines 7 and 10, processor 410 finds a measure of variation, such as the principal variance $\sigma(u)$ 802, of the third set, that is, the projected neighbours 722 of $Q(u)$ 716 in the subspace $W_m$ 714. This is achieved by first constructing a matrix A whose columns are the mean-centred projection of the neighbours 722 of $Q(u)$ 716 in $W_m$ 714. The principal variance $\sigma(u)$ 802 is found to be the largest singular value of A.

In Line 12, processor 410 selects a pixel $u_0 \in \mathcal{J}_m \setminus \mathcal{K}_m$ with the maximal principal variance $\sigma(u_0)$. Thereafter, in Line 13, processor 410 finds a direction $V_m \subset W_m$ 902 onto which the projection of $\mathcal{K}_m$ 708 and 710 has maximal variance. In Line 14, processor 410 finds a subspace $U_m \subset W_m$ 904 that is orthogonal to the direction $V_m$ 902. At the end of each iteration, processor 410 chooses the initial sample pixels $\Omega_m^{(0)}$ of the $m^{th}$ cluster under the $m^{th}$ illuminant as those close to pixel $u_0$ in both the original radiance space and the projection subspace $U_m$, as shown in Line 15 and FIG. 10.

Optimisation

FIG. 14 illustrates Algorithm 3 which summarises the steps of the optimisation approach as performed by processor 410. Note that the optimisation outputs the weight $\alpha_m$, the maximal pixel subsets $\Omega_m$ for each of the illuminants in the scene and the contribution of each light $L_m$ at each pixel u, i.e. $p(L_m|u)$. The iterations of our algorithm terminate when the estimated mixing coefficients and the subsets of sample pixels $\Omega_m$, m=1, ..., M converge, i.e. no further updates are made.

To recover the mixed illumination at each pixel, processor 410 computes the power spectrum of the illuminant $L_m$ from the subset of pixels $\Omega_m$. This is achieved by applying a colour constancy method, such as the Grey-World [7], Grey-Edge [44] and White-Patch algorithm [28] to this subset of pixels. Processor 410 can then re-estimate the per-pixel illumination using the probabilities $p(L_m|u)$, as follows $$L(u) = \sum_{m=1}^{M} p(L_m | u) L_m. \quad (12)$$

For the optimisation, processor 410 departs from the initial set of pixels and maximises the cost function in Equation 11. Using the approximation in Equation 6, we can rewrite this cost function as $$F \approx \sum_{u \in \mathcal{I}} \log\left( \sum_{m=1}^{M} \frac{\alpha_m}{n_m} \sum_{v \in \Omega_m} K_h(\|I(u) - I(v)\|) \right) - \beta \mathcal{R}^* - |\mathcal{I}| \log h, \quad (13)$$

where $|\mathcal{I}|$ is the total number of image pixels.

Since the last term on the right hand side of Equation 13 is a constant, we can simply remove it from further consideration. We also note that the current setting assumes an implicit relationship between the posterior probability $p(L_m|u)$ and the likelihood of the image radiance $p_m(u)$ by Bayes rule as follows $$p(L_m \mid u) = \frac{\alpha_m p_m(u)}{\sum_{q=1}^{M} \alpha_q p_q(u)}. \qquad (14)$$

As a result, processor 410 can constrain the optimisation using Equation 14. To this end, processor 410 adopts a coordinate-ascent optimisation approach by performing an iterative algorithm consisting of two interleaving steps per iteration. The first step re-estimates the posterior probability distribution $p(L_m|I(u))$, whereas the second one estimates the mixing coefficient $\alpha_m$ and expands the set $\Omega_m$ for each illuminant once the posterior probability distribution is at hand. In the following part, we index these variables to the iteration number t and describe the optimisation steps in detail.

Updating the Posterior Probabilities $p(L_m|u)$

With the initial mixture coefficients and sample pixels under each illuminant, processor 410 proceeds to estimate the posterior probability. Let us use the shorthand $p^{(t)}(L_m|u)$ to denote the estimate of $p(L_m|u)$ given the values of $\alpha^{(t)}$ and the sample pixels set $\Omega^{(t)}$ at the $t^{th}$ iteration. Also, let $\bar{p}^{(t)}(L_m|u)$ denote the Bayesian estimate of $p(L_m|u)$ given by Equation 14 with respect to $\alpha^{(t)}$ and $p_m^{(t)}(u) \triangleq p(I(u)|\Omega_m^{(t)})$.

Since only the second term, i.e. the spatial smoothness term, of the cost function in Equation 13 is dependent on $p(L_m|u)$, this optimisation step can be viewed as that aiming to find a posterior probability which minimises $$F_1 = \beta \sum_{m=1}^{M} \sum_{u \in I} \sum_{w \in N(u)} [p(L_m \mid u) - p(L_m \mid w)]^2 + \qquad (15)$$

$$\gamma \sum_{m=1}^{M} \sum_{u \in I} (p(L_m \mid u) - \bar{p}^{(t)}(L_m \mid u))^2,$$

where $\gamma \geq 0$ is the weight of the Bayesian constraint.

Setting the derivative of $F_1$ with respect to $p(L_m|u)$ to zero, we obtain $$(\beta|N(u)| + \gamma)p(L_m \mid u) - \beta \sum_{w \in N(u)} p(L_m \mid w) = \gamma \bar{p}^{(t)}(L_m \mid u) \qquad (16)$$

Note that, following Equation 16, there exists a linear system of equations with respect to the variables $\{p(L_m|u) | u \in I\}$ for each illuminant m. To solve such a system under the constraints that $0 \leq p(L_m|u) \leq 1$ and $\sum_{m=1}^{M} p(L_m|u) = 1$, processor 410 may use the standard linear solver technique in [45].

Updating the mixing coefficients $\alpha_m$

Having estimated the posterior probability, processor 410 now estimates the mixture coefficients $\alpha_m$. We note that only the first term of the function in Equation 13, which we denote $\tau_1$, is dependent on this subset of variables. For the current estimate of the posterior distribution $p^{(t+1)}(L_m|u)$, the expected value of this term is $$\mathbb{E}(\tau_1) = \sum_{u \in I} \sum_{m=1}^{M} \log \alpha_m p^{(t+1)}(L_m \mid u) + \qquad (17)$$

$$\sum_{u \in I} \sum_{m=1}^{M} \log\left(\frac{\sum_{v \in \Omega_m} K_h(\|I(u) - I(v)\|)}{n_m}\right) p^{(t+1)}(L_m \mid u).$$

Thus, processor 410 maximises the function above with respect to $\alpha$ under the constraint $\sum_{m=1}^{M} \alpha_m = 1$. By setting the derivative of the equation above with respect to $\alpha$ to zero, processor 410 computes $$\alpha_m^{(t+1)} = \frac{\sum_{u \in I} p^{(t+1)}(L_m \mid u)}{|I|} \qquad (18)$$

Expanding the subsets of pixels $\Omega_m$

With the posterior probabilities $p(L_m|u)$ and the mixture coefficients $\alpha_m$ in hand, processor 410 expands the subset of sample pixels $\Omega_m$ for each illuminant $L_m$. This implies that, for each m, processor 410 finds a subset $\Omega_m$ that maximises the weighted $$\text{sum} \sum_{u \in I} \log\left(\frac{\sum_{v \in \Omega_m} K_h(\|I(u) - I(v)\|)}{n_m}\right) p^{(t+1)}(L_m \mid u),$$

where the weights $p^{(t+1)}(L_m|u)$ are obtained in the previous step.

Before proceeding further, we define the following notation. For each pixel u in the image, we define its dominant light $l(u)$ to be the one with the largest posterior probability, i.e. such that $l(u) = \arg\max_{1 \leq m \leq M} p(L_m|u)$. Also, we denote $\Upsilon_m$ as the subset of pixels having the $m^{th}$ illuminant as their dominant illuminant $\Upsilon_m = \{u \in I | l(u) = m\}$ such that $p(L_m|u) > t_l$, where $t_l$ is a preset threshold close to 1.

To expand $\Omega_m$ processor 410 adopts a greedy approach. Expanding cluster $\Omega_m$ may also be referred to as growing the cluster by associating a further point of the image which is not associated with any of the multiple clusters with one of the multiple clusters. We note that the kernel value $K_h(\|I(u)-I(v)\|)$ is large when the vectors $I(u)$ and $I(v)$ are close. For each pixel $u \in \Upsilon_m$, to maximise $K_h(\|I(u)-I(v)\|)$, processor 410 chooses a subset $\mathcal{S}^r(u)$ of r-nearest neighbours of u in the spectral radiance space, where r is a preset constant. The union of the subsets $\mathcal{S}^r(u)$, where $u \in \Upsilon_m$, are then augmented to the current subset of pixels under the $m^{th}$ illuminant. In other words, the sample pixels under the $m^{th}$ illuminant is updated using the rule $\Omega_m^{(t+1)} \leftarrow \Omega_m^{(t)} \cap (\cap_{u \in \Upsilon_m} \mathcal{S}^r(u))$.

Several variants of the above methods may be employed, including the general Grey World (general GW) [7], the first-order Grey Edge ($1^{st}$ GE) and $2^{nd}$-order Grey Edge ($2^{nd}$ GE) [44].

Processor 410 may employ a Gaussian kernel to estimate the probability density function of the radiance vector $I(u)$ according to Equations 4 and 5. Processor 410 may set the kernel width h to be the standard deviation of all the pair-wise distances between the radiance spectra in the input scene.

The ground truth colour of the light sources may be obtained by placing several grey surfaces over the scene and manually annotating the area for every region. Using a Sigma SD10 camera with a Foveon X3 sensor, the images may be acquired at a spatial resolution of roughly 384×256. The camera white balancing mode may be kept fixed at the overcast setting. All the images may be stored in RGB colour space but may be converted to linear sRGB [21].

Ground truth illumination colour images may be acquired using grey spray-painted scenes. The data may be captured with a Canon EOS 550D camera and a Sigma 17-70 mm lens. The image intensity value may be linear as the RAW data from the camera may be converted using dcraw with gamma set to 1.0 and without any white balancing. To avoid under-exposure and over-exposure artifacts, different fixed shutter speeds may be used across the 17 different illumination conditions.

The imagery may be gamma corrected in order only to enhance the visibility of the dark regions. Other than that, the input imagery used as input may be unmodified from the original, with special care taken in preserving the linearity of the data.

To provide a quantitative evaluation of the segmentation results, we adopt an accuracy measure based on the overlap between the ground-truth and the estimated region for each illuminant. Let $A_m^{gt}$ and $A_m^{est}$ be respectively the ground-truth and the estimated region of the $m^{th}$ illuminant. The segmentation error is then formulated as $$\varepsilon = \frac{1}{M} \sum_{m=1}^{M} \frac{A_m^{gt} \cap A_m^{est}}{A_m^{gt} \cup A_m^{est}}, \quad (19)$$

where $A_m^{gt} \cap A_m^{est}$ denotes the intersection of the estimated and ground truth regions of the $m^{th}$ light and $A_m^{gt} \cup A_m^{est}$ their union.

FIG. 15 illustrates a qualitative demonstration of the illuminant segmentation results. The figure includes sample illuminant segmentation maps for four scenes. The first column shows the input image while the second column show the illuminant regions recovered by method 500. Each colour in the segmentation maps corresponds to a distinct illuminant label.

Note that, despite the spatial smoothness assumption on the illumination, our algorithm can still handle images with sharp illumination edge or shadow edges. In such situations, processor 410 can set a low value of β for the regulariser $\mathcal{R}*$ in Equation 11 so that the separation of illuminant segments is governed mainly by the illuminant likelihood term, i.e. the second term on the left-hand side of the equation. One example value is β=5.

The accuracy of the estimated illuminants for each image may be computed as the mean of the Euclidean angular deviation of the estimated illuminant spectrum or colour vector from the respective ground-truth over the image pixels. Another error measure is the RMS chromaticity difference [1, 8]. It is worth noting, however, that the mean Euclidean angular deviation and the RMS chromaticity difference are correlated when the chromaticity vector is normalised to unit $L^2$-norm.

In one example, several grey balls are placed under various illumination regions in the scene. Hence, a single illuminant colour can be estimated for each local region using the Grey-World algorithm. In another example, the illuminant colour is measured at every scene point. To do this, the input scenes may be painted in grey and the illumination image may be captured by illuminating the grey-painted scenes under the same illumination condition as the input colour image.

FIG. 16 illustrates the colour correction results, that is, image data modified by processor 410 and stored on data store 408(b), based on the spatially varying illuminant colour estimated by method 500. To perform colour correction on the original images, processor 410 may substitute the illuminant per pixel with a single white light as the reference illuminant. Note that the colour-corrected images using the illuminant colour estimated by method 500 exhibit a good level of chromaticity consistency over the scene, especially within the same material regions across illuminant boundaries. Furthermore, method 500 yields neutral colour corrected imagery. In contrast, alternatives often exhibit colour shades strongly influenced by the original illuminant and colour bleeding along illuminant boundaries.

It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating", "optimizing" or "determining" or "displaying" or "maximising" or "selecting" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

REFERENCES

[3] Michael Bleier and Christian Riess and Shida Beigpour and Eva Eibenberger and Elli Angelopoulou and Tobias Troger and André Kaup. Color constancy and non-uniform illumination: Can existing algorithms work?. *ICCV Workshops*, pages 774-781, 2011.

[7] G. Buchsbaum. A spatial processor model for object colour perception. *Journal of the Franklin Institute*, 310 (1):337-350, 1980.

[21] Gijsenij, Arjan and Lu, Rui and Gevers, Theo. Color Constancy for Multiple Light Sources. *IEEE Transactions on Image Processing*, 21(2):697-707, 2012.

[22] J. P. Hoffbeck and D. Landgrebe. A method for estimating the number of components in a normal mixture density function. *Proceedings of Geoscience and Remote Sensing Symposium*, pages 1675-1677, 2000.

[23] Hsu, Eugene and Mertens, Tom and Paris, Sylvain and Avidan, Shai and Durand, Frédo. Light mixture estimation for spatially varying white balance. *ACM SIGGRAPH 2008 papers* in SIGGRAPH '08, pages 70:1-70:7, New York, N.Y., USA, 2008. ACM.

[24] C. P. Huynh and A. Robles-Kelly. A Solution of the Dichromatic Model for Multispectral Photometric Invariance. *International Journal of Computer Vision*, 90(1):1-27, 2010.

[25] Ravindran Kannan and Hadi Salmasian and Santosh Vempala. The spectral method for general mixture models. 18*th Annual Conference on Learning Theory (COLT)*, pages 444-457, 2005.

[28] Land, E. H. and McCann, J. J. Lightness and Retinex Theory. *Journal of Optical Society America*, 61(1):1-11, 1971.

[36] J. Nocedal and S. Wright. *Numerical Optimization*. Springer, 2000.

[37] Parzen, Emanuel. On Estimation of a Probability Density Function and Mode. *The Annals of Mathematical Statistics*, 33(3):1065-1076, 1962.

[40] Scott, D. W. *Multivariate Density Estimation: Theory, Practice, and Visualization* of Wiley Series in Probability and Statistics. Wiley isbn=9780471547709, 1992.

[42] W. S. Stiles and J. M. Burch. N.P.L. colour-matching investigation: Final report (1958). *Optica Acta*, 6:1-26, 1959.

[44] van de Weijer, J. and Gevers, T. and Gijsenij, A. Edge-Based Color Constancy. *IEEE Transactions on Image Processing*, 16(9):2207-2214, 2007.

[45] Wright, S. J. *Primal-Dual Interior-Point Methods of Miscellaneous* Bks. Society for Industrial and Applied Mathematics, 1997.

[46] Zickler, Todd and Mallick, Satya P. and Kriegman, David J. and Belhumeur, Peter N. Color Subspaces as Photometric Invariants. *International Journal of Computer Vision*, 79(1):13-30, 2008.

The invention claimed is:

1. A computer implemented method for estimating an illumination spectrum of an image, the image being comprised of points of wavelength indexed spectral data, the wavelength indexed spectral data defining an input spectrum for each point of the image, the method comprising:
   determining for each point of a first set of points of the image a measure of variation in relation to the input spectrum of that point by
   randomly selecting a second set of points of the image from the points of the image, the second set and the first set being disjoint,
   determining a projection of the input spectrum of each point of the first set onto a subspace spanned by the input spectra of the points of the second set,
   determining a third set of points of the image for each point of the first set based on the projection, and
   determining the measure of variation of the projection of the input spectra of the points of the third set onto the subspace spanned by the input spectra of the points of the second set;
   selecting one point from the first set based on the measure of variation for each point of the first set such that the variation in relation to the input spectrum of the selected one point of the first set is greater than the variation in relation to the input spectra of other points of the first set;
   determining a cluster of points of the image based on the input spectrum of the selected one point of the first set; and
   determining an estimate for the illumination spectrum based on the input spectra of points of the image in the cluster.

2. The method of claim 1, further comprising repeating the method to determine multiple clusters of points of the image and to determine an estimate for the illumination spectrum for each of the multiple clusters.

3. The method of claim 2, further comprising determining the first set of points of the image by excluding from the points of the image, the cluster of points from a previous iteration.

4. The method of claim 1 further comprising:
   determining a first direction by maximising a variance of projections of the input spectra of the points of the second set onto the first direction; and
   determining an orthogonal subspace that is orthogonal to the first direction, wherein determining the cluster of points of the image comprises determining the cluster of points of the image based on a first difference to the input spectrum of the selected one of the first set and the first difference is based on a projection of the input spectrum onto the orthogonal subspace.

5. The method of claim 1, wherein determining the cluster of points of the image comprises determining the cluster of points of the image based on a second difference to the input spectrum of the selected one point from the first set.

6. The method of claim 1, further comprising:
   repeating the method to determine multiple clusters of points of the image; and
   growing the multiple clusters of points of the image by associating a fourth point of the image which is not associated with any of the multiple clusters with one of the multiple clusters.

7. The method of claim 6, wherein growing the multiple clusters of points of the image comprises:
   determining a similarity measure between the fourth point of the image and each of the multiple clusters;
   selecting one of the multiple clusters based on the similarity measure for each of the multiple clusters; and
   associating the fourth point of the image with the selected one of the multiple clusters.

8. The method of claim 6, wherein growing the multiple clusters is based on a smoothness constraint.

9. The method of claim 7, wherein the similarity measure is based on a difference between the input spectrum of the fourth point of the image and the input spectra of points of the image in each of the multiple clusters.

10. The method of claim 9, wherein the difference is based on a kernel function.

11. The method of claim 7, wherein the similarity measure is based on a probability density function.

12. The method of claim 1, wherein the image is a hyperspectral or multispectral image.

13. The method of claim 1, further comprising storing the estimate for the illumination spectrum on a datastore.

14. The method of claim 1, further comprising:
   processing the image based on the illumination spectrum to obtain a processed image; and
   storing the processed image on a datastore.

15. A non-transitory computer-readable medium, including computer-executable instructions stored thereon that when executed by a processor, causes the processor to perform the method of claim 1.

16. A computer system for estimating an illumination spectrum of an image, the image being comprised of points of wavelength indexed spectral data, the wavelength indexed spectral data defining an input spectrum for each point of the image, the computer system comprising:
- a processor to determine for each point of a first set of points of the image a measure of variation in relation to the input spectrum of that point, by
  - randomly selecting a second set of points of the image from the points of the image, the second set and the first set being disjoint,
  - determining a projection of the input spectrum of each point of the first set onto a subspace spanned by the input spectra of the points of the second set,
  - determining a third set of points of the image for each point of the first set based on the projection, and
  - determining the measure of variation of the projection of the input spectra of the points of the third set onto the subspace spanned by the input spectra of the points of the second set;
- select one point from the first set based on the measure of variation for each point of the first set such that the variation in relation to the input spectrum of the selected one point of the first set is greater than the variation in relation to the input spectra of other points of the first set,
- determine a cluster of points of the image based on the input spectrum of the selected one point of the first set, and
- determine an estimate for the illumination spectrum based on the input spectra of points of the image in the cluster.

\* \* \* \* \*